United States Patent
Khanchandani et al.

(10) Patent No.: US 9,633,218 B2
(45) Date of Patent: Apr. 25, 2017

(54) IDENTITIES AND PERMISSIONS

(71) Applicant: Microsoft Technology Licensing, LLC, Redmond, WA (US)

(72) Inventors: Niraj S. Khanchandani, Bellevue, WA (US); Alexander Marliave Hehmeyer, Bellevue, WA (US); Suresh Parameshwar, Redmond, WA (US); Nissim Natanov, Sammamish, WA (US); Maryam Khabazan, Kirkland, WA (US); Shoaev S. Hares, Redmond, WA (US); Misrak G. Ararso, Bellevue, WA (US); Nicholas A. Bigelow, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 14/634,590

(22) Filed: Feb. 27, 2015

(65) Prior Publication Data

US 2016/0253511 A1    Sep. 1, 2016

(51) Int. Cl.
G06F 21/62    (2013.01)
G06F 17/30    (2006.01)
H04L 29/06    (2006.01)
H04L 29/08    (2006.01)

(52) U.S. Cl.
CPC .... *G06F 21/6218* (2013.01); *G06F 17/30339* (2013.01); *H04L 63/102* (2013.01); *H04L 63/104* (2013.01); *H04L 67/1044* (2013.01)

(58) Field of Classification Search
CPC .................................................. G06F 21/6218
USPC .............................................................. 726/4
See application file for complete search history.

(56) References Cited

U.S. PATENT DOCUMENTS

| | | | |
|---|---|---|---|
| 6,725,269 B1 | 4/2004 | Megiddo |
| 7,428,750 B1 | 9/2008 | Dunn et al. |
| 8,233,604 B2 | 7/2012 | Lei |
| 8,359,396 B2 | 1/2013 | Chan et al. |
| 8,549,061 B2 | 10/2013 | Rao et al. |
| 8,611,339 B2 | 12/2013 | Jana et al. |
| 8,620,942 B1 | 12/2013 | Hoffman et al. |
| 8,626,837 B2 | 1/2014 | Fisher et al. |
| 8,701,014 B1 | 4/2014 | Schlegel et al. |

(Continued)

OTHER PUBLICATIONS

Wolinsky, et al., "Managing NymBoxes for Identity and Tracking Protection", In Proceedings of Conference on Timely Results in Operating Systems Available at: <https://www.usenix.org/system/files/conference/trios14/trios14-paper-wolinsky.pdf>, Oct. 5, 2014, 16 pages.

(Continued)

*Primary Examiner* — Jacob Lipman

(57) ABSTRACT

Techniques for identity management for permissions are described. According to various embodiments, a user establishes a communication relationship with another user, referred to herein as a "contact." According to various embodiments, the contact is associated with multiple identities. Accordingly, embodiments discussed herein enable a primary identity to be specified such that permissions for the primary identity are enforced for interactions with the contact. Further, techniques discussed herein enable a primary identity to be updated based on a change in identity state of a contact.

20 Claims, 14 Drawing Sheets

(56) References Cited

U.S. PATENT DOCUMENTS

| | | |
|---|---|---|
| 8,706,677 B2 | 4/2014 | Eytchison et al. |
| 8,738,764 B1 | 5/2014 | Newstadt et al. |
| 8,745,271 B2 | 6/2014 | O'Sullivan et al. |
| 2007/0100835 A1* | 5/2007 | Carter ............... G06F 17/30867 |
| 2007/0240226 A1 | 10/2007 | Song et al. |
| 2008/0005325 A1 | 1/2008 | Wynn et al. |
| 2009/0125521 A1 | 5/2009 | Petty |
| 2009/0265753 A1* | 10/2009 | Anderson ........... H04L 63/0421 |
| | | 726/1 |
| 2011/0029618 A1 | 2/2011 | Lavy et al. |
| 2011/0045806 A1 | 2/2011 | Gupta et al. |
| 2013/0080927 A1 | 3/2013 | Weaver et al. |

OTHER PUBLICATIONS

"International Search Report and Written Opinion Issued in PCT Application No. PCT/US2016/019436", Mailed Date: May 6, 2016, 11 pages.

"Second Written Opinion", Application No. PCT/US2016/019436, Jan. 27, 2017, 5 pages.

* cited by examiner

Fig. 2

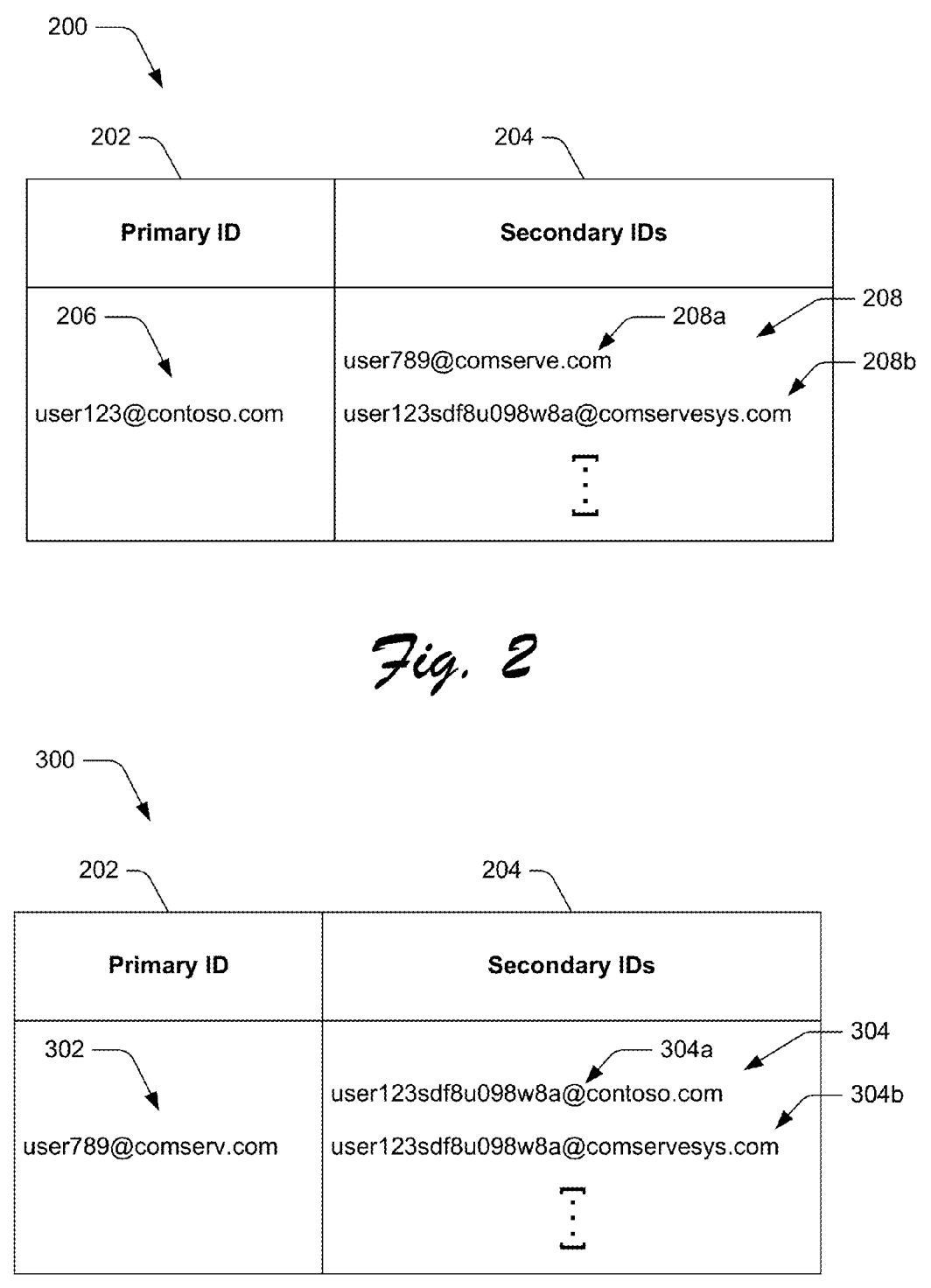

| Primary ID | Secondary IDs |
|---|---|
| user123@contoso.com | user789@comserve.com<br>user123sdf8u098w8a@comservesys.com<br>... |

Fig. 3

| Primary ID | Secondary IDs |
|---|---|
| user789@comserv.com | user123sdf8u098w8a@contoso.com<br>user123sdf8u098w8a@comservesys.com<br>... |

| Primary ID | Secondary IDs |
|---|---|
| user123@contoso.com | user123sdf8u098w8a@comserve.com<br>user123sdf8u098w8a@contsosys.com<br>⋮ |

*Fig. 4*

IDENTITIES AND PERMISSIONS

BACKGROUND

Today's connected computing environment provides users with a variety of different ways of communicating with one another. For instance, users may communicate via instant messaging (IM), audio and/or video calls (e.g., using Voice over Internet Protocol (VoIP)), in-app messaging, and so forth. While these different forms of communication provide a diversity of communication opportunities, they bring with them a number of challenges. Among these challenges is the management of user identities. For instance, a particular individual user may be represented by several different identities across different communication modalities. Maintaining user privacy while allowing communication with a user utilizing their set of identities is a primary consideration.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for identity management for permissions are described. According to various embodiments, a user establishes a communication relationship with another user, referred to herein as a "contact." According to various embodiments, the contact is associated with multiple identities. Accordingly, embodiments discussed herein enable a primary identity to be specified such that permissions for the primary identity are enforced for interactions with the contact. Further, techniques discussed herein enable a primary identity to be updated based on a change in identity state of a contact.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 depicts an example identity table in accordance with one or more embodiments.

FIG. 3 depicts an example identity table in accordance with one or more embodiments.

FIG. 4 depicts an example identity table in accordance with one or more embodiments.

DETAILED DESCRIPTION

Overview

Techniques for identity management for permissions are described. According to various implementations, a user establishes a communication relationship with another user, referred to herein as a "contact." Generally, the communication relationship enables the user to interact with the contact in various ways, such as to engage in communication events with the contact, view presence information for the contact, and so forth.

According to various implementations, the contact is associated with multiple identities. The contact, for instance, creates multiple identities that each identify the contact in different platforms. For example, the contact has one identity for interacting with a communication service (e.g., a Voice over Internet Protocol (VoIP) service), another identity for accessing email, another identity for a social network platform, and so forth. Further, the individual identities may be associated with different privacy levels and permitted behaviors, referred to herein as "permissions."

Accordingly, techniques discussed herein enable a primary identity to be specified such that permissions for the primary identity are enforced for interactions with the contact. For instance, the primary identity is given priority over other secondary identities for the contact such that permissions for the primary identity are enforced across multiple different identities.

Further, techniques discussed herein enable a primary identity to be updated based on a change in identity state of a contact. For instance, a contact may link multiple identities together such that a new primary identity is specified. In another example, a contact may unlink a set of linked identities, which causes a new primary identity to be specified.

Generally, permissions specify allowed and/or disallowed behaviors and interactions in relation to a contact. For instance, permissions may specify which types of information about a contact other users are permitted to obtain and/or not obtain. Further, permissions may specify particular communication interactions with a contact that are permitted and/or not permitted. Accordingly, a contact is better able to control which types of interactions are permitted with the contact, and which types of contact's information are exposed to other users. Thus, techniques discussed herein protect user privacy and sensitive information by enforcing permissions based on a contact's primary identity.

In the following discussion, an example environment is first described that is operable to employ techniques described herein. Next, a section entitled "Example Procedures" describes some example methods in accordance with one or more implementations. Finally, a section entitled "Example System and Device" describes an example system and device that are operable to employ techniques discussed herein in accordance with one or more embodiments.

Example Environment

Figure 1:
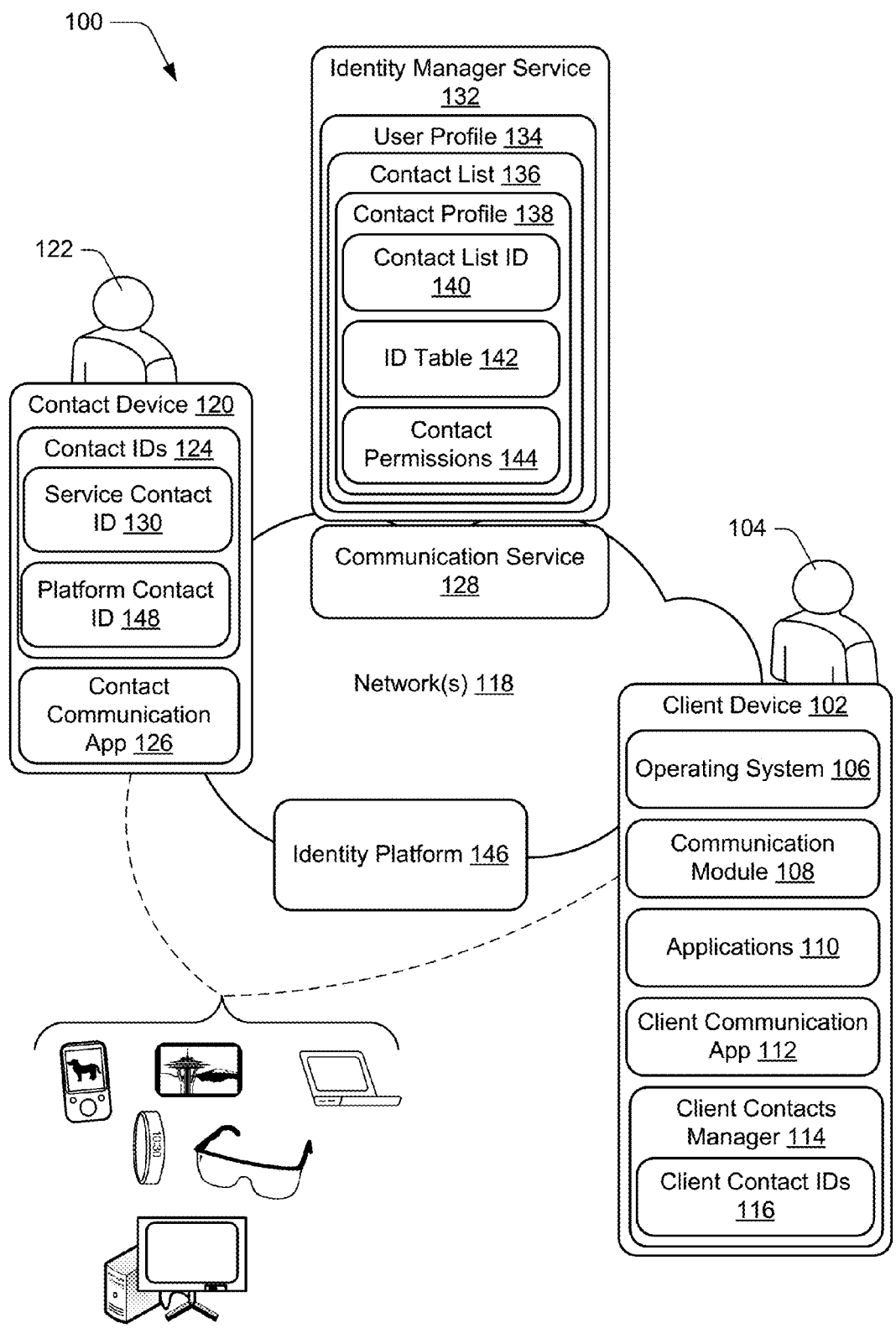
FIG. 1 is an illustration of an environment in an example implementation that is operable to employ techniques discussed herein in accordance with one or more embodiments.

FIG. 1 is an illustration of an environment 100 in an example implementation that is operable to employ techniques for identity management for permissions in accordance with one or more implementations. Environment 100 includes a client device 102 associated with a user 104. Generally, the client device 102 can be implemented as any suitable device such as, by way of example and not limitation, a smartphone, a tablet computer, a wearable computing device, a portable computer (e.g., a laptop), a desktop computer, a smart appliance (e.g., an Internet of Things ("IoT") device, and so forth. One of a variety of different examples of a client device 102 is shown and described below in FIG. 15.

The client device 102 includes a variety of different functionalities that enable various activities and tasks to be performed. For instance, the client device 102 includes an operating system 106, a communication module 108, applications 110 including a client communication application ("app") 112, and a client contacts manager 114.

Generally, the operating system 106 is representative of functionality for abstracting various system components of the client device 102, such as hardware, kernel-level modules and services, and so forth. The operating system 106, for instance, can abstract various components of the client device 102 to the applications 110 to enable interaction between the components and the applications 110.

The communication module 108 is representative of functionality for enabling the client device 102 to communication over wired and/or wireless connections. For instance, the communication module 108 represents hardware and logic for communication via a variety of different wired and/or wireless technologies and protocols.

The applications 110 represents functionalities for performing different tasks via the client device 102. Examples of the applications 110 include a word processing application, a spreadsheet application, a web browser, a gaming application, and so forth. The applications 110 may be installed locally on the client device 102 to be executed via a local runtime environment, and/or may represent portals to remote functionality, such as cloud-based services, web apps, and so forth. Thus, the applications 110 may take a variety of forms, such as locally-executed code, portals to remotely hosted services, and so forth.

According to various implementations, the client device 102 is configured to communicate with other devices and/or entities via the client communication app 112. Generally, the client communication app 112 is representative of functionality to enable different forms of communication via the client device 102. Examples of the client communication app 112 include a voice communication application (e.g., a Voice over Internet Protocol (VoIP) client), a video communication application, a messaging application, a content sharing application, a Unified Communications (UC) application, and combinations thereof. The client communication app 112, for instance, enables different communication modalities to be combined to provide diverse communication scenarios.

The client contacts manager 114 is representative of functionality to track a variety of different contact information about contacts for a user of the client device 102. Examples of such contact information include names, addresses (physical and electronic), personal information (e.g., birthdates, anniversaries, and so forth), phone numbers, presence information, and so forth. The client contacts manager 114, for instance, tracks client contact identifiers (IDs) 116 for the individual client contacts. The client contact IDs 116 are generally representative of identities that can be used to initiate communication events with different contacts, and to recognize incoming communication events from contacts. For instance, the client contact IDs 116 represent usernames for contacts across different communication systems and modalities. In at least some implementations, the client contacts manager 114 is representative of functionality for performing various aspects of techniques for identity management for permissions discussed herein. Various functionalities and operations of the client contacts manager 114 are detailed below.

According to various implementations, the client device 102 communicates with other devices and entities via connectivity to a network 118. Generally, the network 118 is representative of a single network or a combination of different interconnected networks. For instance, the network 118 represents a combination of wireless and wired networks and may be configured in a variety of ways, such as a wide area network (WAN), a local area network (LAN), the Internet, and so forth.

The environment 100 further includes a contact device 120 associated with a contact 122. The contact 122, for instance, is representative of a user represented in the client contact IDs 116. The contact device 120 is representative of an end-user client device for communication between the user 104 and the contact 122. The contact device 120 maintains contact identifiers (IDs) 124, which are representative of different identities for the contact 122. For instance, as presented in more detail below, the contact 122 may be associated with multiple different contact IDs 124 that each identify the contact 122 for different forms of communication and/or across different identity platforms. While the contact device 120 is represented as a single device, it is to be appreciated that the contact 122 may interact with multiple different devices to engage with interactions with the client device 102.

The contact device 120 further includes a contact communication application ("app") 126, which is representative of functionality to enable different forms of communication via the contact device 120. In at least some implementations, the contact communication app 126 represents a different communication application than the client communication app 112, or represents an instance of the client communication app 112.

According to various implementations, a communication service 128 is leveraged to manage communication between the client device 102 and the contact device 120. The communication service 128, for instance, is representative of a network service that performs various tasks for initiation and management of communication between the client device 102 and the contact device 120. For example, the communication service 128 can manage initiation, moderation, and termination of communication sessions between the client communication app 112 and the contact communication app 126.

To enable the contact device 120 to authenticate and communicate via the communication service 128, the contact IDs 124 include a service contact identity ("ID") 130. Generally, the service contact ID 130 represents an identity generated for the contact 122 and that the contact 122 can use to authenticate with the communication service 128 and to participate in communication events via the communication service 128. Further, the client device 102 may initiate communication events with the contact device 120 utilizing the service contact ID 130, and may recognize incoming communication events from the contact 122 based on the service contact ID 130. According to various implementations, the service contact ID 130 represents an ID generated via user interaction with the communication service 128. For instance, the service contact ID 130 is created when the user creates an account with the communication service 128.

The communication service 128 maintains a presence across many different networks including the network 118 and can be implemented according to a variety of different architectures, such as a cloud-based service, a distributed service, a web-based service, and so forth. Examples of the communication service 128 include a VoIP service, an online conferencing service, a UC&C service, and so forth. In at least some implementations, the client communication app 112 and/or the contact communication app 126 represent portals to the communication service 128.

The environment 100 further includes an identity manager service 132, which is representative of functionality to manage different attributes of identities for different users, such as the user 104 and the contact 122. The identity manager service 132 may be implemented and managed by the communication service 128, or may be implemented as a standalone service. Generally, the identity manager service 132 may provide identity management services for a variety of different entities.

The identity manager service 132 maintains a user profile 134, which is representative of a user profile for the user 104 of the client device 102. The identity manager service 132, for instance, maintains different user profiles for different users of the communication service 128. According to various implementations, the user profile 134 includes authentication information that enables the client device 102 to authenticate with the communication service 128 such that the user 104 may engage in communication events utilizing the communication service 128.

For the user profile 134, the identity manager service 132 maintains a contacts list 136. Generally, the contacts list 136 tracks various information for contacts for the user 104, such as contact information for at least some of the contacts managed by the client contacts manager 114. Examples of different contact-related information are presented above.

The contacts list 136 includes a contact profile 138 for the contact 122, and which includes various contact information for the contact 122. The contact profile 138 includes a contact list identity ("ID") 140, an identity ("ID") table 142, and contact permissions 144. The contact list ID 140 represents an identity utilized to represent the contact 122 in the contacts list 136, and the ID table 142 tracks different identities for the contact 122. In at least some implementations, the contact list ID 140 represents a primary identity for the contact 122. Example implementations of the ID table 142 are discussed below.

The contact permissions 144 are representative of different privacy and permission settings for the contact 122. The contact permissions 144, for instance, specify which types of information for the contact 122 may and may not be shared with others, such as with the user 104. The contact permissions 144 further identify specific users and/or sets of user that are permitted to obtain certain information about the contact 122, and may optionally identify users and/or sets of users that are not permitted to obtain certain information about the contact 122. Further aspects and attributes of the contact permissions 144 are detailed below.

The environment 100 further includes an identity platform 146, which generally represents an entity with which the contact 122 and other users maintain an identity. Examples of the identity platform 146 include a website, a social networking platform, an email service, an Internet service provider, and so forth. The contact 122 has a platform contact identity ("ID") 148 as part of the contact IDs 124, which represents an identity that the contact 122 leverages to interact with the identity platform 146. The contact 122, for example, utilizes the platform contact ID 148 to authenticate with the identity platform 146, and to access services and/or content exposed by the identity platform 146. According to various implementations, the platform contact ID 148 represents an ID generated via user interaction with the identity platform 146. For instance, the platform contact ID 148 is created when the user creates an account with the identity platform 146.

FIGS. 2-4 depict different example instances of the ID table 142 in accordance with one of more implementations. As referenced above, the ID table 142 tracks different identities for the contact 122.

FIG. 2 depicts an ID table 200, which represents an instance of the ID table 142 in accordance with one or more implementations. The ID table 200 includes a primary ID column 202 and a secondary ID column 204. The primary ID column 202 includes a primary ID 206 for the contact 122. According to various implementations, the primary ID 206 represents an ID that is utilized for initiating communication with the contact device 120 and for applying the contact permissions 144. The contact permissions 144, for example, are bound to the primary ID 206 such that the contact permissions 144 are enforced when the primary ID 206 is utilized for communication.

The secondary ID column 204 includes secondary IDs 208 for the contact 122 that are linked to the primary ID 206. In this particular example, the secondary IDs 208 include a secondary ID 208a and a secondary ID 208b. Generally, the secondary IDs 208 are utilized for various processes, such as for backend communication and processing by the communication service 128, the identity manager service 132, and so forth. While the ID table 142 is depicted as including two secondary IDs, it is to be appreciated that any number of secondary IDs may be utilized, such as a single secondary ID, more than two secondary IDs, and so forth.

In this particular example, the primary ID 206 represents an instance of the platform contact ID 148 for the contact 122 utilized by the identity platform 146. As referenced above, the platform contact ID 148 is generated in response to user interaction with the identity platform 146, such as when a user creates a user account with the identity platform 146. Thus, in this example the primary ID 206 represents an ID utilized by the contact 122 to authenticate and interact with the identity platform 146. Further, the secondary ID 208a represents an instance of the service contact ID 130 used to authenticate the contact 122 with the communication service 128. As referenced above, the service contact ID 130 is generated in response to user interaction with the communication service 128, such as when a user creates a user account with the communication service 128.

According to various implementations, the secondary ID 208b represents an identity used by the communication service 128 for managing communication data for communication events that involve the contact device 120. For instance, the secondary ID 208b represents a proxy identity that is generated for various backend processing and routing tasks, such as by the identity manager service 132.

According to various implementations, the primary ID 206 and the secondary IDs 208 are linked such that when one of the IDs is utilized for a particular purpose, the other IDs are discovered such as by referencing the ID table 200. Further, by virtue of being linked to the primary ID 206, the secondary IDs 208 are linked to the permissions that are bound to the primary ID 206, such as the contact permissions 144.

According to one or more implementations, the contact 122 may interact with contact communication app 126 and/or the identity manager service 132 to expressly link the primary ID 206 with the secondary ID 208a, such as via input to a graphical user interface (GUI) for managing identities of the contact 122. Thus, the ID table 200 represents an implementation where the service contact ID 130 and the platform contact ID 148 are linked.

FIG. 3 depicts an ID table 300, which represents an instance of the ID table 142 in accordance with one or more implementations. The ID table 300 includes the primary ID column 202 and the secondary ID column 204. The primary ID column 202 includes a primary ID 302. The secondary ID column 204 includes secondary IDs 304, including a secondary ID 304a and a secondary ID 304b.

As depicted, the primary ID 302 is the same as the secondary ID 208a of the ID table 200 depicted in FIG. 2, and represents an instance of the service contact ID 130. In this particular implementation, for example, the contact 122 has utilized the service contact ID 130 to authenticate with the communication service 128.

As further depicted, the platform contact ID 148 is not represented in the ID table 300. Thus, the ID table 300 represents an implementation where the service contact ID 130 and the platform contact ID 148 are not linked. For instance, the contact 122 has not linked the two IDs, or has unlinked the two IDs. Accordingly, since the service contact ID 130 and the platform contact ID 148 are not linked, the secondary ID 304a is generated as a proxy identity that enables the contact 122 to interact with the identity platform 146. For instance, the identity manager service 132 generates the secondary ID 304a and links the secondary ID 304a to the primary ID 302 in the ID table 300. Thus, the secondary ID 304a serves as a representation of the contact 122 for interaction with the identity platform 146, such as for processing and routing of communication data for the contact 122 through the identity platform 146.

The secondary ID 304b represents an identity used by the communication service 128 for managing communication data for communication events that involve the contact device 120. For instance, the secondary ID 304b is identical to the secondary ID 208b depicted in the ID table 200.

FIG. 4 depicts an ID table 400, which represents an instance of the ID table 142 in accordance with one or more implementations. The ID table 400 includes the primary ID column 202 and the secondary ID column 204. The primary ID column 202 includes a primary ID 402. The secondary ID column 204 includes secondary IDs 404, including a secondary ID 404a and a secondary ID 404b.

As depicted, the primary ID 402 is the same as the primary ID 206 of the ID table 200 depicted in FIG. 2, and represents an instance of the platform contact ID 148. In this particular implementation, for example, the contact 122 has utilized the platform contact ID 148 to authenticate with the communication service 128.

As further depicted, the service contact ID 130 is not represented in the ID table 400. Thus, the ID table 400 represents an implementation where the service contact ID 130 and the platform contact ID 148 are not linked. For instance, the contact 122 has not linked the two IDs, or has unlinked the two IDs. Accordingly, since the service contact ID 130 and the platform contact ID 148 are not linked, the secondary ID 404a is generated as a proxy identity that enables the contact 122 to interact with the communication service 128. For instance, the identity manager service 132 generates the secondary ID 404a and links the secondary ID 404a to the primary ID 402 in the ID table 400. Thus, the secondary ID 404a serves as a representation of the contact 122 for interaction with the communication service 128, such as for processing and routing of communication data for the contact 122 through the communication service 128.

The secondary ID 404b represents an identity used by the communication service 128 and/or the identity platform 146 for managing communication data for communication events that involve the contact device 120. For instance, the secondary ID 404b is generated by the identity manager service 132 and is used to route various backend processing and communication events across the identity platform 146 and/or the communication service 128.

Thus, the ID tables 200-400 represent different identity states for the contact 122. As further detailed below, techniques discussed herein enable these different ID states to be utilized to ascertain appropriate permissions to use for the contact 122.

Figure 5:
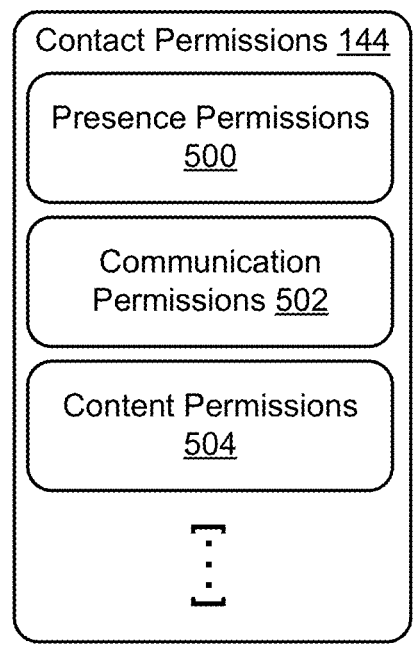
FIG. 5 depicts an example instance of contact permissions in accordance with one or more embodiments.

FIG. 5 depicts an example instance of the contact permissions 144 in accordance with one or more implementations. As referenced above, the contact permissions 144 tracks different permissions and privacy settings for the contact 122.

In this particular example, the contact permissions 144 include presence permissions 500, communication permissions 502, and content permissions 504. The presence permissions 500 identify particular users, groups of users, and/or types of users that are permitted to receive presence information about the contact 122. Alternatively or additionally, the presence permissions 500 identify particular users, groups of users, and/or types of users that are not permitted to receive presence information about the contact 122.

The communication permissions 502 identify particular users, groups of users, and/or types of users that are permitted to engage in particular communication events with the contact 122. Alternatively or additionally, the communication permissions 502 identify particular users, groups of users, and/or types of users that are not permitted to engage in particular communication events with the contact 122. In at least some implementations, the communication permissions 502 are event-type specific. For instance, the communication permissions may specify that a particular user is permitted to send an instant message to the contact 122, but is not permitted to initiate a voice (e.g., VoIP) call with the contact 122.

The content permissions 504 identify particular users, groups of users, and/or types of users that are permitted to access content of the contact 122. Alternatively or additionally, the content permissions 504 identify particular users, groups of users, and/or types of users that are not permitted to access content of the contact 122. In at least some implementations, the content permissions 504 are content-type specific. For instance, the communication permissions may specify that a particular user is permitted to access content of the contact 122 that is published to a public forum, but is not permitted to access content of the contact 122 that is published in a private forum.

These particular examples of contact permissions are presented for purpose of illustration only, and it is to be appreciated that a variety of other types and instances of the contact permissions 144 may be utilized in accordance with the implementations for identity management for permissions discussed herein.

According to various implementations, the contact permissions 144 are linked to a primary identity of the contact 122, such as the service contact ID 130 or the platform contact ID 148. Further, the service contact ID 130 may be associated with a different set of contact permissions 144 than the platform contact ID 148. As further detailed below, which set of contact permissions is enforced depends on which of the service contact ID 130 or the platform contact ID 148 is utilized as a primary ID for the contact 122. For instance, a particular identity may be given priority over other identities as a primary identity such that permissions linked to the primary identity are enforced over other permissions, e.g., permissions for other identities.

Having described an example environment in which the techniques described herein may operate, consider now a discussion of some example procedures for identity management for permissions in accordance with one or more embodiments.

Example Procedures

The following discussion describes some example procedures for identity management for permissions in accordance with one or more embodiments. The example procedures may be employed in the environment 100 of FIG. 1, the system 1500 of FIG. 15, and/or any other suitable environment. In at least some implementations, the steps described for the various procedures can be implemented automatically and independent of user interaction. According to various implementations, the procedures may be performed by the client device 102 (e.g., the client contacts manager 114), the communication service 128, the identity manager service 132, and/or via interaction between these entities.

Figure 6:
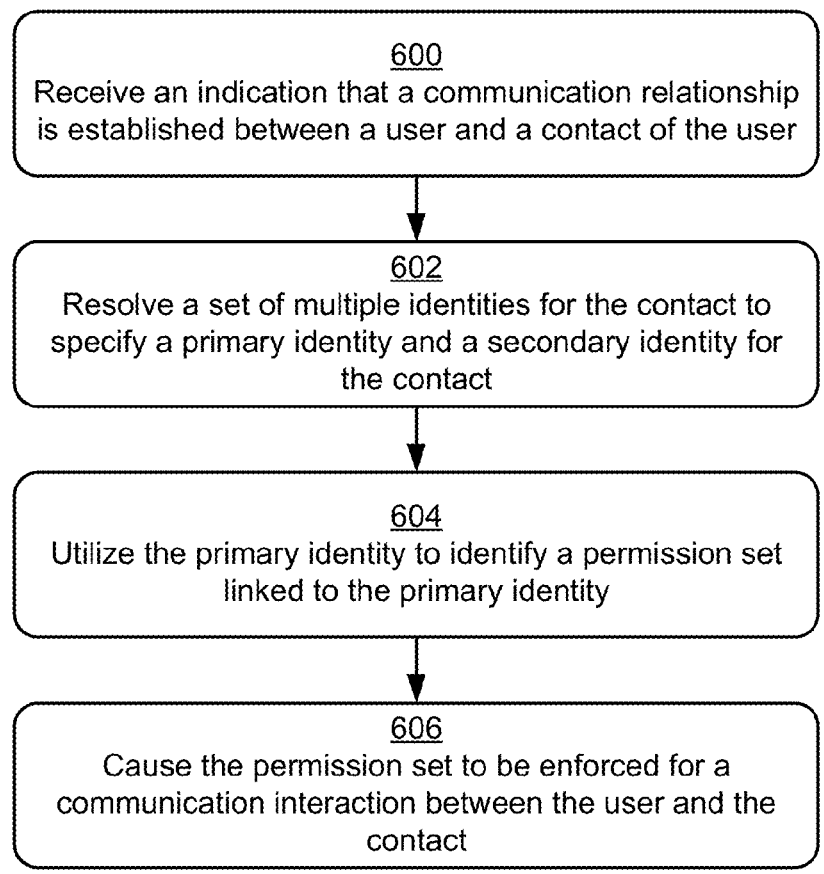
FIG. 6 is a flow diagram that describes steps in a method for identifying permissions to be used for a communication relationship in accordance with one or more embodiments.

FIG. 6 is a flow diagram that describes steps in a method in accordance with one or more implementations. The method, for instance, describes an example procedure for identifying permissions to be used for a communication relationship in accordance with one or more implementations.

Step 600 receives an indication that a communication relationship is established between a user and a contact of the user. For instance, a communication relationship is established between the user 104 and the contact 122. Generally, the communication relationship enables communication to occur between the user 104 and the contact 122, and enables communication-related data to be exchanged between the user 104 and the contact 122. In at least some implementations, communication-related data includes state data for the contact 122, such as presence information indicating a current presence state for the contact 122. The communication relationship, for example, is established via interaction with the communication service 128 and/or the identity manager service 132, such as by creating an entry in the contact list 136 for the contact 122. One example way of establishing a communication relationship is detailed below.

Step 602 resolves a set of multiple identities for the contact to specify a primary identity and a secondary identity for the contact. The identity manager service 132, for instance, ascertains that the contact has multiple identities, and orders the multiple identities to designate a primary identity and one or more secondary identities. In at least some implementations, resolving the identities includes populating the primary identity and the one or more secondary identities to an ID table, examples of which are discussed above. Example ways of resolving multiple identities are described below.

Step 604 utilizes the primary identity to identify a permission set linked to the primary identity. The permission set, for instance, specifies one or more parameters that indicate allowed and/or disallowed communication-related behaviors for the communication relationship. An example permission set and example attributes of a permission set are detailed above.

Step 606 causes the permission set to be enforced for a communication interaction between the user and the contact. For example, the permission set is enforced to allow a communication-related behavior that is indicated as allowed by the permission set, and/or to disallow a communication-related behavior that is indicated as disallowed by the permission set. An example way of enforcing a permission set is detailed below.

In at least some implementations, different identities are associated with different permission sets. For instance, a primary identity is associated with a particular permission set, and a secondary identity is associated with another, different permission set. Thus, in such a scenario, the permission set for the primary identity is enforced over (e.g., instead of) the permission set for the secondary identity.

Figure 7:
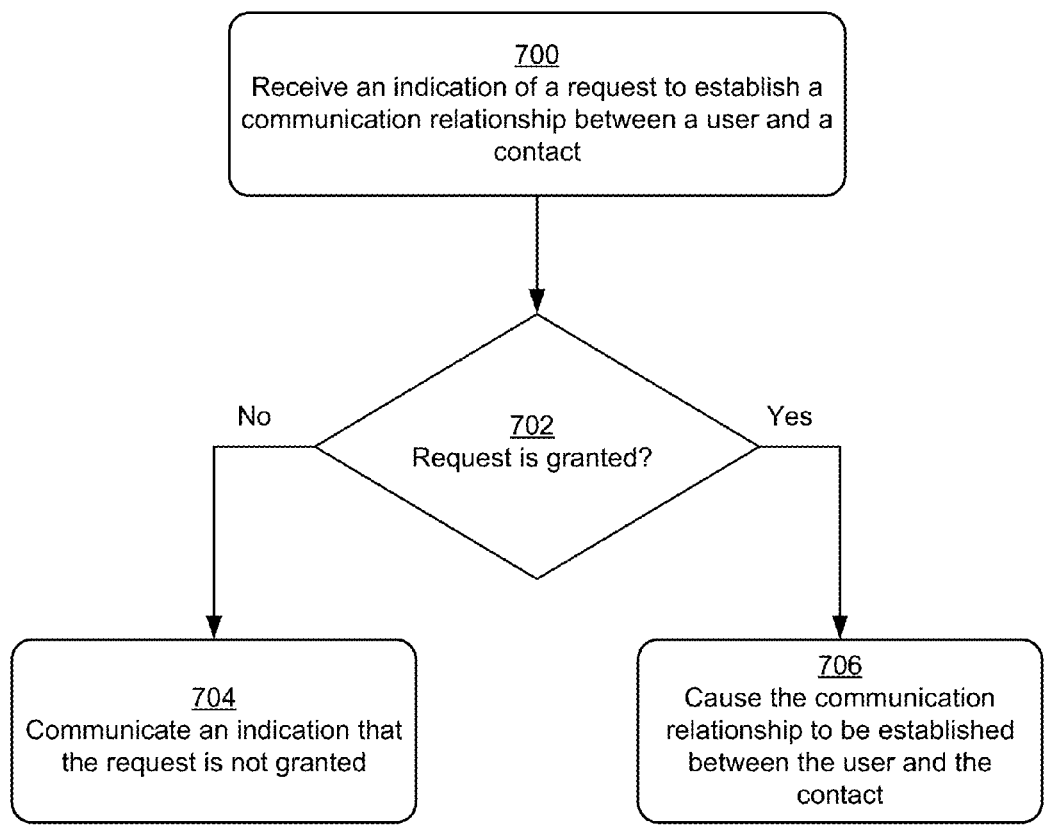
FIG. 7 is a flow diagram that describes steps in a method for establishing a communication relationship in accordance with one or more embodiments.

FIG. 7 is a flow diagram that describes steps in a method in accordance with one or more implementations. The method, for instance, describes an example procedure for establishing a communication relationship in accordance with one or more implementations. For example, the method describes an example way for performing step 600 discussed above with reference to FIG. 6.

Step 700 receives an indication of a request to establish a communication relationship between a user and a contact. In at least some implementations, the request is initiated in response to input from the user, such as interaction by the user 104 with the client communication app 112 and/or the client contacts manager 114. Alternatively or additionally, the request is initiated by an automated process, such as in response to the contact 122 being added to the contacts list 136 for the user 104.

According to one or more implementations, the request includes a request to receive state information for the contact, such as presence information. Generally, presence information represents status indicia that convey an ability and/or willingness of the contact 122 to engage in different types of communication events. Examples of different presence information include "available," "away," "do not disturb," and so forth.

In at least some implementations, the request is communicated to the contact 122. For instance, a visual notification of the request is presented to the contact 122, such as by the contact communication app 126. The visual notification may include selectable controls for accepting, denying, and/or ignoring the request.

Step 702 ascertains whether the request is granted. A determination is made, for example, whether the contact has accepted or denied the request. If the request is not granted ("No"), step 704 communicates an indication that the request is not granted. The indication that the request is not granted may be communicated in various ways, such as a visual indication that the request is pending, that the request is denied, and so forth. In at least some implementations, the indication that the request is not granted occurs because the contact has not yet responded to the request.

In implementations where the request is still pending, the process returns to step 702. Alternatively, if the contact has denied the request, the process ends at step 704.

If the request is granted ("Yes"), step 706 causes the communication relationship to be established between the user and the contact. The request may be granted, for instance, in response to the contact 122 providing input (e.g., to the contact communication app 126) to accept the request to establish the communication relationship. Alternatively or additionally, the request is granted by an automated process an independent of input from the contact 122, such as by the contact communication app 126 and in response to receiving the request.

Figure 8:
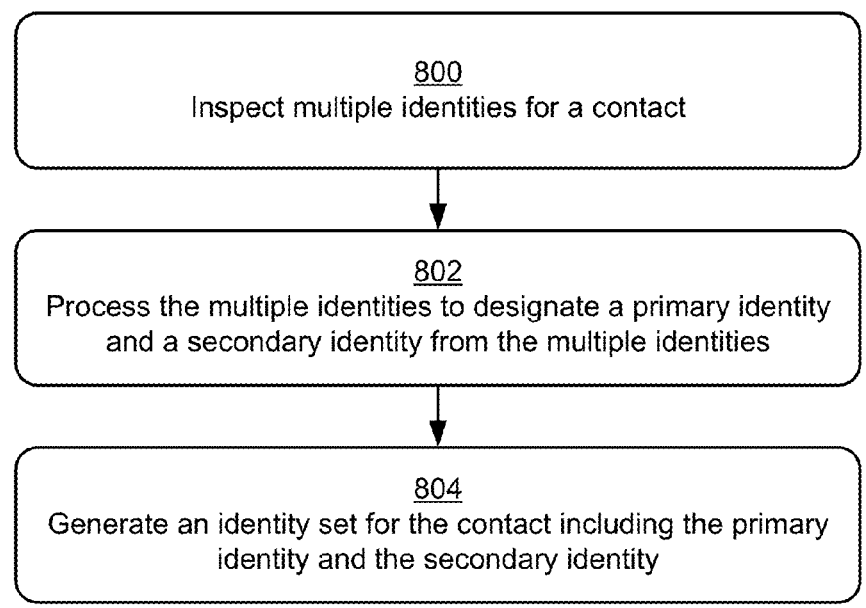
FIG. 8 is a flow diagram that describes steps in a method for resolving a set of multiple identities for a contact in accordance with one or more embodiments.

FIG. 8 is a flow diagram that describes steps in a method in accordance with one or more implementations. The method, for instance, describes an example procedure for resolving a set of multiple identities for a contact in accordance with one or more implementations. For example, the method describes an example way for performing step 602 discussed above with reference to FIG. 6.

Step 800 inspects multiple identities for a contact. The identities, for instance, include different identities that represent the contact for different entities. With reference to the contact 122, for example, the identities include identities that represent the contact 122 for the communication service 128 and/or the identity platform 146. In at least some implementations, the identities include identities that have been linked to one another, such as in response to user input linking the identities. For instance, the contact 122 may link the service contact ID 130 with the platform contact ID 148.

Step 802 processes the multiple identities to designate a primary identity and a secondary identity from the multiple identities. In one or more implementations, certain types of identities are designed to be used for primary identities. For instance, certain domains (e.g., web domains) are identified to be used for primary identities, such as by the identity manager service 132. With reference to the environment 100, for example, an identity generated for the identity platform 146 is specified to be used as a primary identity.

Step 804 generates an identity set for the contact including the primary identity and the secondary identity. The identity set, for instance, is populated to an ID table for the contact, examples of which are discussed above. The ID table may be utilized for various purposes, such as for ascertaining permissions to be enforced for interaction with the contact.

Figure 9:
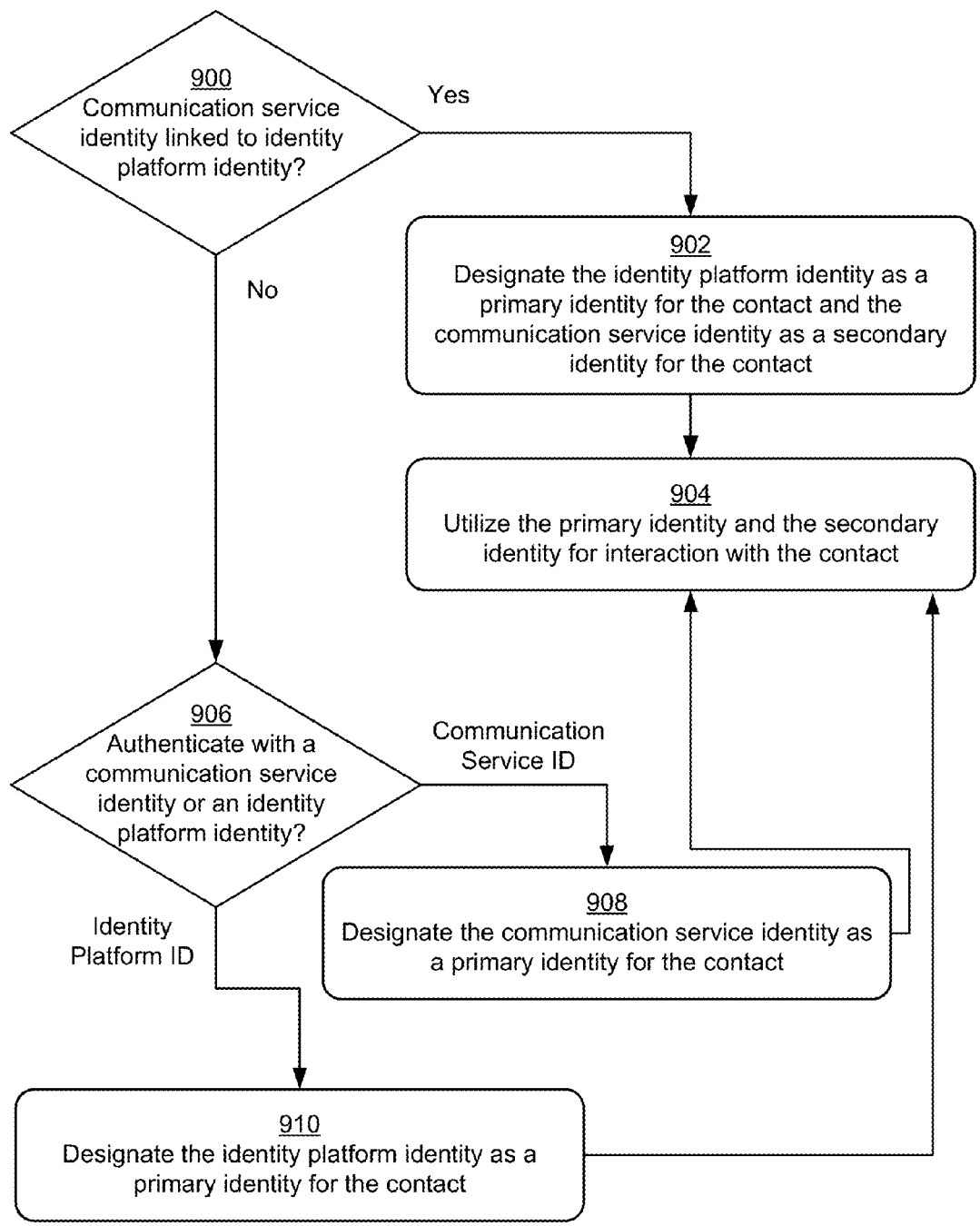
FIG. 9 is a flow diagram that describes steps in a method for designating a primary identity for a contact in accordance with one or more embodiments.

FIG. 9 is a flow diagram that describes steps in a method in accordance with one or more implementations. The method, for instance, describes an example procedure for designating a primary identity for a contact in accordance with one or more implementations. For example, the method describes an example way for performing step 602 discussed above with reference to FIG. 6.

Step 900 ascertains whether a contact has a communication service identity that is linked to an identity platform identity for the contact. The identity manager service 132, for example, ascertains whether the service contact ID 130 is linked to the platform contact ID 148. The IDs, for example, may be linked in response to user input linking the IDs. Generally, linking the IDs causes the IDs to be bound to one another such that one ID is discoverable when the other ID is utilized.

If the contact has a communication service identity that is linked to an identity platform identity ("Yes"), step 902 designates the identity platform identity as a primary identity for the contact and the communication service identity as a secondary identity for the contact. The identity manager service 132, for example, propagates the identity platform identity and the communication service identity to an ID table, examples of which are described above. In at least some implementations, an identity platform identity is designated as a higher-priority identity than the communication service identity, and thus is designated as the primary identity.

Step 904 utilizes the primary identity and the secondary identity for interaction with the contact. For instance and as detailed elsewhere herein, the primary identity is utilized to identify permissions that specify allowed and/or disallowed communication behaviors for interacting with the contact. Further, if the secondary identity is used for some purpose, the primary identity is discovered such that permissions linked to the primary identity are enforced.

Returning to step 900, if the contact does not have a communication service identity that is linked to an identity platform identity for the contact ("No"), step 906 determines whether the contact authenticates with a communication service with a communication service identity or an identity platform identity. The identity manager service 132, for example, determines whether the user 104 authenticates with the communication service 128 utilizing the service contact ID 130 or the platform contact ID 148.

If a communication service identity is used to authenticate with the communication service ("Communication Service ID"), step 908 designates the communication service identity as a primary identity for the contact. In at least some implementations, one or more secondary identities are also designated. For instance, a proxy identity for the contact is generated and designated as a secondary identity for representing the contact with the identity platform 146. In a scenario where the contact utilizes the communication service identity to authenticate with the communication service 128, this may indicate that the contact has not created an identity with the identity platform 146 or has not linked the contact's identity platform identity with the communication service identity. Thus, a proxy identity platform ID can be created as a secondary identity for the contact to enable the contact to be represented to the identity platform 146 for various interactions. The process then proceeds to step 904.

If an identity platform identity is used to authenticate with the communication service ("Identity Platform ID"), step 910 designates the identity platform identity as a primary identity for the contact. In at least some implementations, one or more secondary identities are also designated. For instance, a proxy identity for the contact is generated and designated as a secondary identity for representing the contact with the communication service 128. In a scenario where the contact utilizes the identity platform identity to authenticate with the communication service 128, this may indicate that the contact has not created an identity with the communication service 128 or has not linked the contact's communication service identity with the identity platform identity. Thus, a proxy identity platform ID can be created as a secondary identity for the contact to enable the contact to be represented to the identity platform 146 for various interactions. The process then proceeds to step 904.

Figure 10:
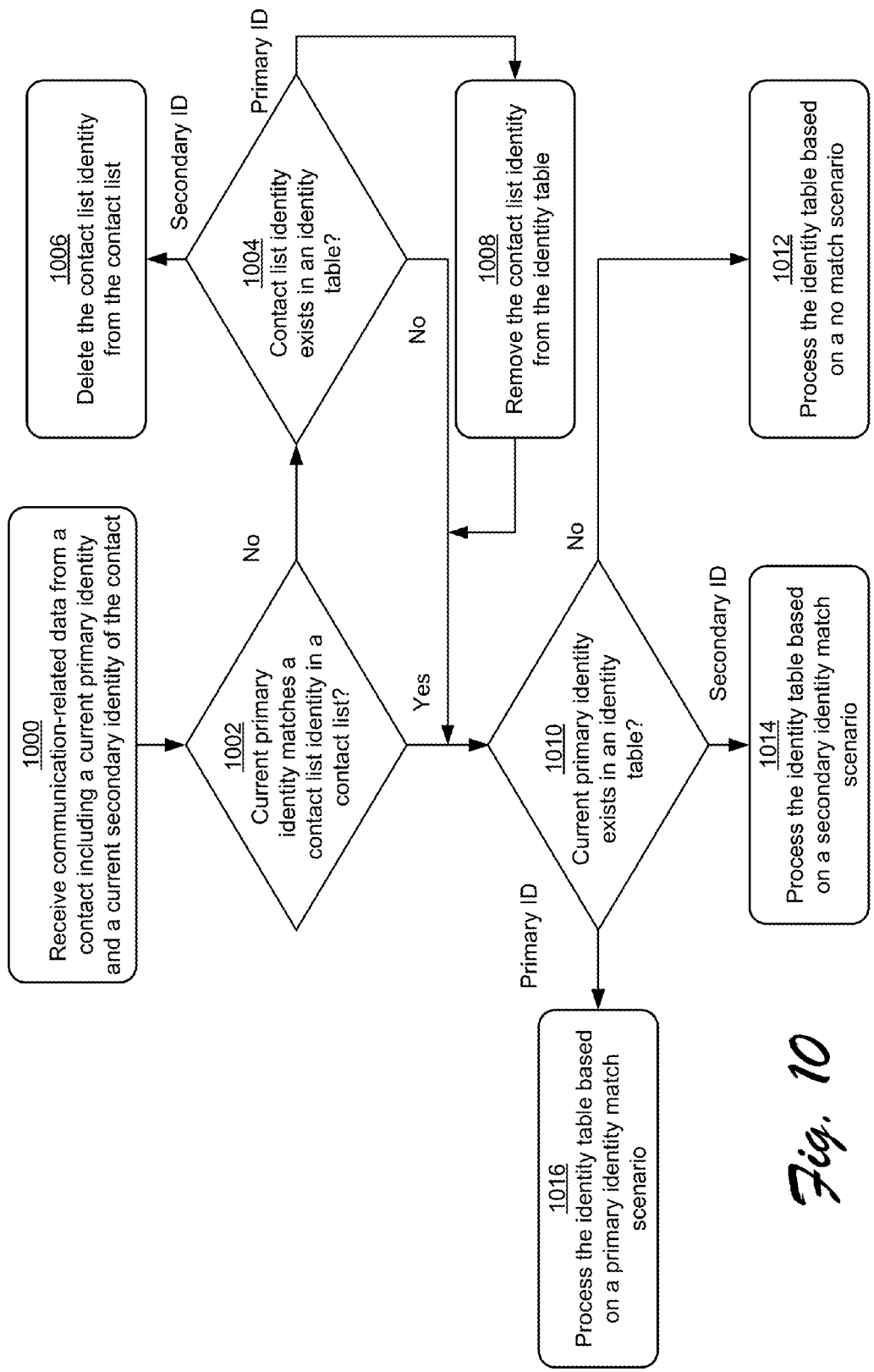
FIG. 10 is a flow diagram that describes steps in a method for maintaining identities for a contact in accordance with one or more embodiments.

FIG. 10 is a flow diagram that describes steps in a method in accordance with one or more implementations. The method, for instance, describes an example procedure for maintaining identities for a contact in accordance with one or more implementations. For example, the method describes an example way for maintaining and updating the ID table 142 for the contact 122.

Step 1000 receives communication-related data from a contact including a current primary identity and a current secondary identity of the contact. The communication-related data may take various forms, such as a communication event from the contact, state data for the contact, and so forth. In at least some implementations, the communication-related data includes presence information for the contact.

Step 1002 ascertains whether the current primary identity matches a contact list identity in a contact list entry for the contact. The identity manager service 132, for instance, ascertains whether the current primary identity matches the contact list ID 140.

If the current primary identity does not match the contact list identity ("No"), step 1004 determines whether the contact list identity exists in an identity table. The identity manager service 132, for example, scans an ID table and/or set of ID tables to determine whether an entry including the contact list identity exists in the ID table(s).

According to various implementations, a mismatch between the contact list identity and the primary identity received with the communication-related data indicates that an identity state for the contact 122 has changed. For instance, the contact 122 may have linked two or more identities, may have unlinked identities, and so forth. Thus, based on the change in identity state, the identity manager service 132 will update its contact profile 138 to reflect an updated identity state for the contact 122.

If the contact list identity exists as a secondary identity in the ID table ("Secondary ID"), step 1006 deletes the contact list identity from the contact list. The identity manager service 132, for instance, deletes the contact list identity from the contacts list 136. According to various implementations, the contact list identity being included in the ID table as a secondary identity indicates that the contact list identity is bound to a different primary identity in the contacts list 136. As illustrated in the example ID tables, a secondary identity is bound to a primary identity in a set of contact identities. Thus, since a different primary identity is bound to this secondary identity, the secondary identity is deleted from the contact list to avoid an identity conflict.

Returning to step 1004, if the contact list identity exists as a primary identity in the identity table ("Primary ID"), step 1008 removes the contact list identity from the identity table. The identity manager service 132, for instance, deletes the contact list identity from the identity table. For instance, in a scenario where the contact list identity is different than the current primary identity as determined in step 1002, and the contact list identity is listed as a primary identity as determined in step 1004, this indicates that the identity state for the contact has changed. Accordingly, the contact list identity is removed from the identity table such that an updated identity table entry can be generated for the contact. The process then proceeds to a step 1010 discussed below.

Returning to step 1004, if the contact list identity does not exist in the identity table ("No"), the process proceeds to step 1010 discussed below.

Returning to step 1002, if the current primary identity matches the contact list identity ("Yes"), step 1010 determines whether the current primary identity exists in an identity table. The identity manager service 132, for example, scans an ID table and/or set of ID tables to determine whether an entry including the current primary identity exists in the ID table(s).

If the current primary identity does not exist in the identity table ("No"), step 1012 processes the identity table based on a no match scenario. An example procedure for processing an identity table based on a no match scenario is discussed below.

If the current primary identity exists as a secondary identity in the identity table ("Secondary ID"), step 1014 processes the identity table based on a secondary identity match scenario. An example procedure for processing an identity table based on a secondary identity match scenario is discussed below.

If the current primary identity exists as a primary identity in the identity table ("Primary ID"), step 1016 processes the identity table based on a primary identity match scenario. An example procedure for processing an identity table based on a primary identity match scenario is discussed below.

Generally, the "Yes" and "No" branches from the step 1002 represent different ways of processing an identity table for a contact based on whether the current primary identity of the contact matches the contact identity specified for the contact in the contact list, and cause the identity table to specify the current primary identity as a primary identity for the contact. For instance, the procedure described in FIG. 10 represents a procedure for maintaining an ID table in a current state.

Figure 11:
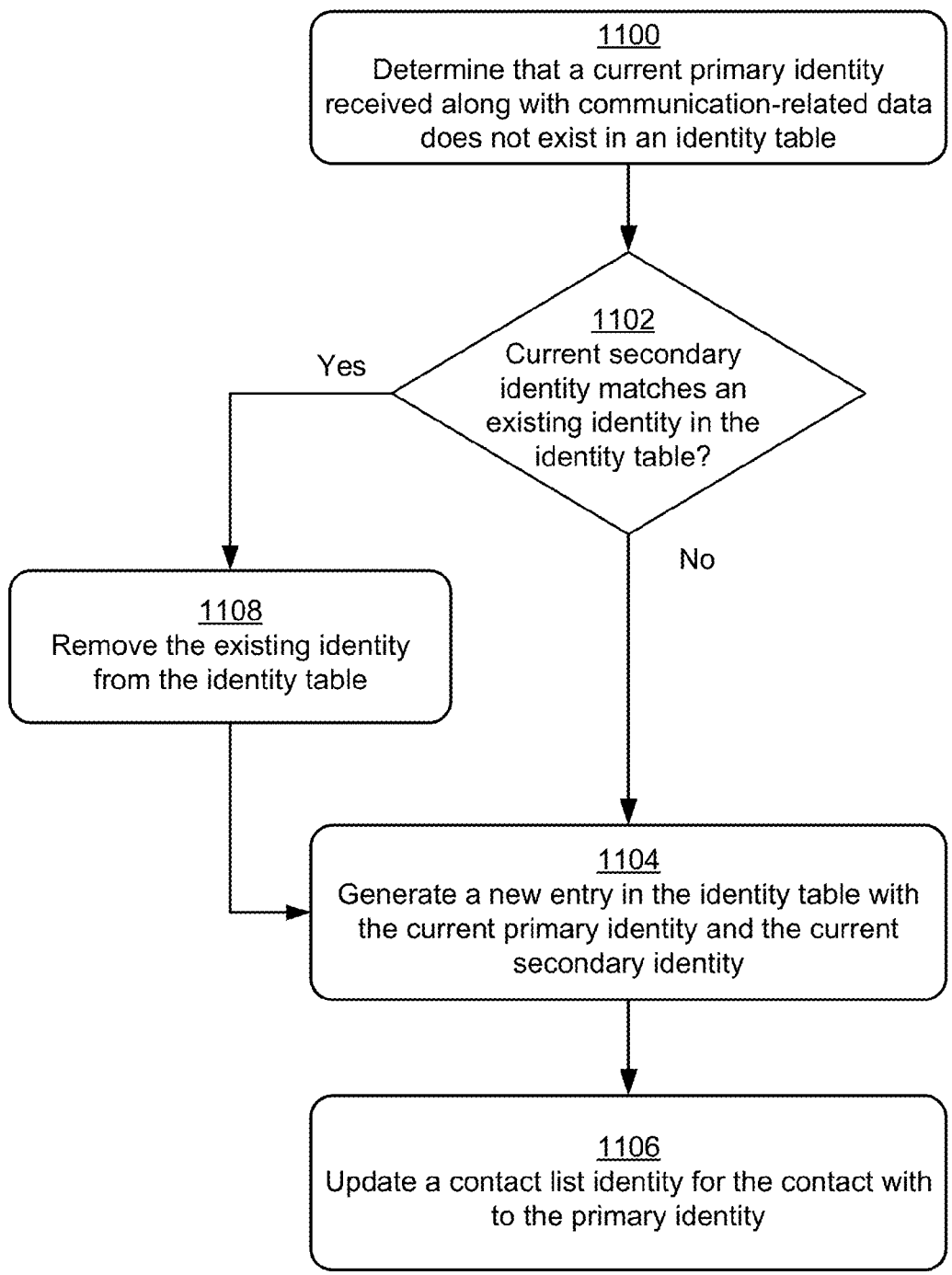
FIG. 11 is a flow diagram that describes steps in a method for processing an identity table in accordance with one or more embodiments.

FIG. 11 is a flow diagram that describes steps in a method in accordance with one or more implementations. The method, for instance, describes an example procedure for processing an identity table based on a scenario in which a current primary identity received with communication-related data does not match an identity in an identity table in accordance with one or more implementations. For example, the method describes an example way for performing step 1012 of the procedure discussed above with reference to FIG. 10, and represents an extension of the procedure. According to various implementations, the procedure describes a scenario where a new contact is added.

Step 1100 determines that a current primary identity received along with communication-related data does not exist in an identity table. The identity manager service 132, for example, scans an ID table and/or set of ID tables to determine that the primary identity does not exist in the ID table(s).

Step 1102 ascertains whether a current secondary identity received along with the communication-related data matches an existing identity in the identity table. As referenced above, communication-related data is received from a contact along with a current primary identity and one or more current secondary identities. The identity manager service 132, for example, scans an ID table and/or set of ID tables to determine whether an entry including the current secondary identity exists in the ID table(s).

If the current secondary identity does not match an existing identity in the identity table ("No"), step 1104 generates a new entry in the identity table with the current primary identity and the current secondary identity. The new entry, for instance, corresponds to an identity table for a new contact and that can be used to track identity state for the new contact according to techniques for identity management for permissions discussed herein.

Step 1106 updates a contact list identity for the contact with to the primary identity. The contact list ID 140, for example, is updated to match the primary identity. Thus, the primary identity from the ID table 142 matches the contact list ID 140 such that the identity state maintained by the identity manager service 132 for the contact 122 is up-to-date.

Returning to step 1102, if the current secondary identity matches an existing identity in the identity table ("Yes"), step 1108 removes the existing identity from the identity table. The identity manager service 132, for example, deletes the existing identity to avoid an identity conflict. The procedure then proceeds to step 1104.

Figure 12:
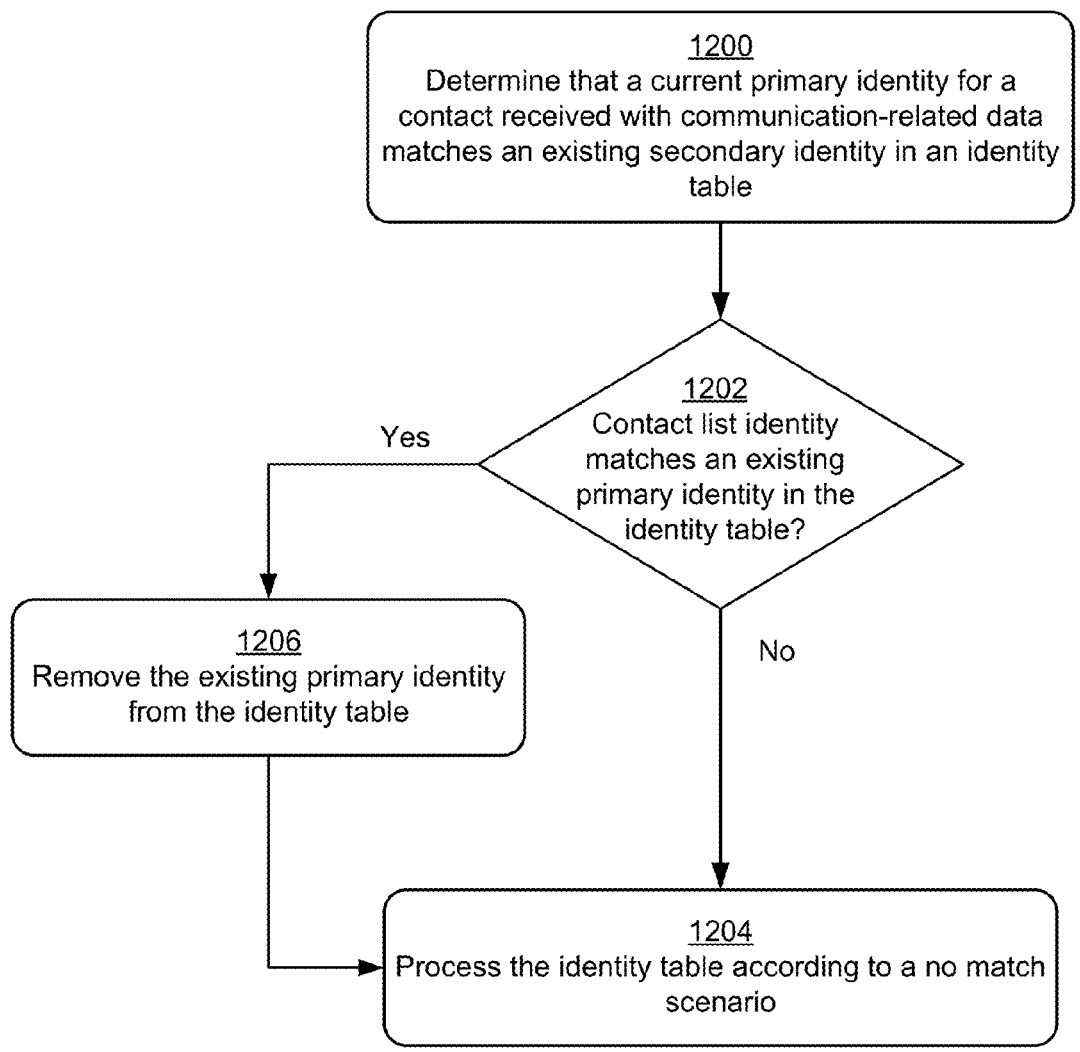
FIG. 12 is a flow diagram that describes steps in a method for processing an identity table in accordance with one or more embodiments.

FIG. 12 is a flow diagram that describes steps in a method in accordance with one or more implementations. The method, for instance, describes an example procedure for processing an identity table based on a scenario where a current primary identity received with communication-related data matches a secondary identity in an identity table in accordance with one or more implementations. For example, the method describes an example way for performing step 1014 of the procedure discussed above with reference to FIG. 10, and represents an extension of the procedure.

Step 1200 determines that a current primary identity for a contact received with communication-related data matches an existing secondary identity in an identity table. The identity manager service 132, for example, scans an ID table and/or set of ID tables to determine that the primary identity exists as a secondary identity in the ID table(s).

Step 1202 ascertains whether a contact list identity for the contact matches an existing primary identity in the identity table. If the contact list identity for the contact does not match an existing primary identity in the identity table ("No"), step 1204 processes the identity table according to a no match scenario. An example way of processing an identity table according to a no match scenario is described above with reference to FIG. 11.

If the contact list identity for the contact matches an existing primary identity in the identity table ("Yes"), step 1206 removes the existing primary identity from the identity table. The identity manager service 132, for example, deletes the primary identity from the identity table to avoid an identity conflict. The process then proceeds to step 1204. According to various implementations, the identity table is processed to generate a new user entry using the current primary identity, such as described above with reference to FIG. 11.

Figure 13:
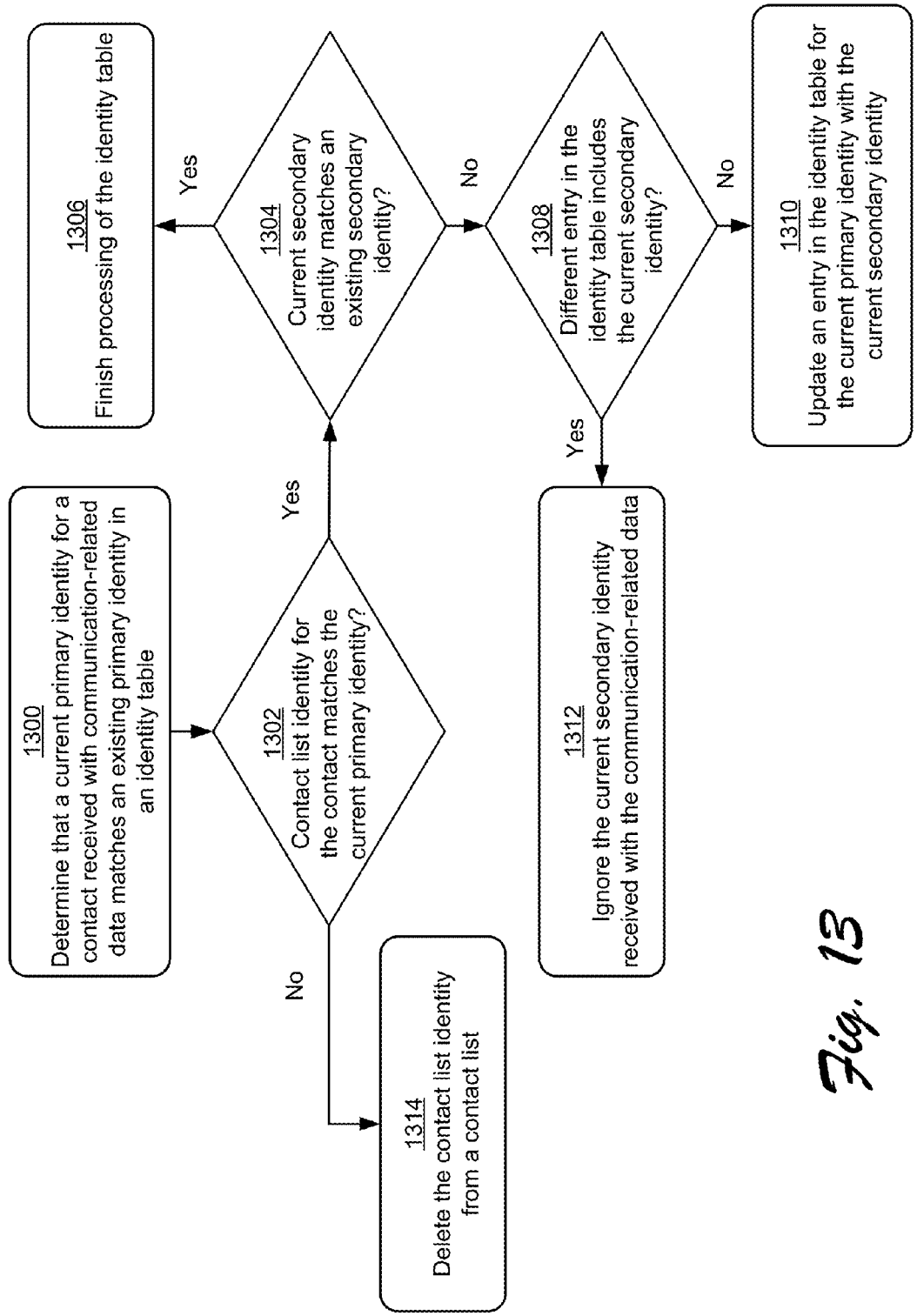
FIG. 13 is a flow diagram that describes steps in a method for processing an identity table in accordance with one or more embodiments.

FIG. 13 is a flow diagram that describes steps in a method in accordance with one or more implementations. The method, for instance, describes an example procedure for processing an identity table based on a scenario where a current primary identity received with communication-related data matches a primary identity in an identity table in accordance with one or more implementations. For example, the method describes an example way for performing step 1016 of the procedure discussed above with reference to FIG. 10, and represents an extension of the procedure.

Step 1300 determines that a current primary identity for a contact received with communication-related data matches an existing primary identity in an identity table. The identity manager service 132, for example, scans an ID table and/or set of ID tables to determine that the current primary identity exists as a primary identity in the ID table(s).

Step 1302 ascertains whether a contact list identity for the contact matches the current primary identity. If the contact list identity for the contact matches the current primary identity ("Yes"), step 1304 determines whether a current secondary identity received with the communication-related data matches an existing secondary identity linked to the existing primary identity in the identity table. If the current secondary identity matches an existing secondary identity for the existing primary identity ("Yes"), step 1306 finishes processing of the identity table. The identity manager service 132, for example, ascertains that the identities in the ID table for the contact 122 are current and thus do not need to be updated.

If the current secondary identity does not match an existing secondary identity for the existing primary identity ("No"), step 1308 ascertains whether a different entry in the identity table includes the current secondary identity. The identity manager service 132, for example, scans the identity table to ascertain whether the existing secondary identity matches an identity for a different contact in the identity table.

If a different entry in the identity table does not include the current secondary identity ("No"), step 1310 updates an entry in the identity table for the current primary identity with the current secondary identity. The identity manager service 132, for example, causes the current secondary identity to be stored in an ID table in an entry along with the current primary identity. Thus, the current secondary identity is linked to the current primary identity in the ID table, such as part of the ID table 142 for the contact 122.

If a different entry in the identity table includes the current secondary identity ("Yes"), step 1312 ignores the current secondary identity received with the communication-related data. According to various implementations, this indicates that a different contact (e.g., a different primary identity) is linked to the current secondary identity, and thus the different contact is given priority to utilize the current secondary identity. Thus, the current secondary identity is not linked in the ID table to the current primary identity received with the communication-related data.

Returning to step 1302, if the contact list identity for the contact does not match the current primary identity ("No"), step 1314 deletes the contact list identity from a contact list. In at least some implementations, this indicates that an identity state for the contact has changed, and thus the contact list identity is no longer current for the contact. Thus, the contact list identity is removed from the contact list.

Figure 14:
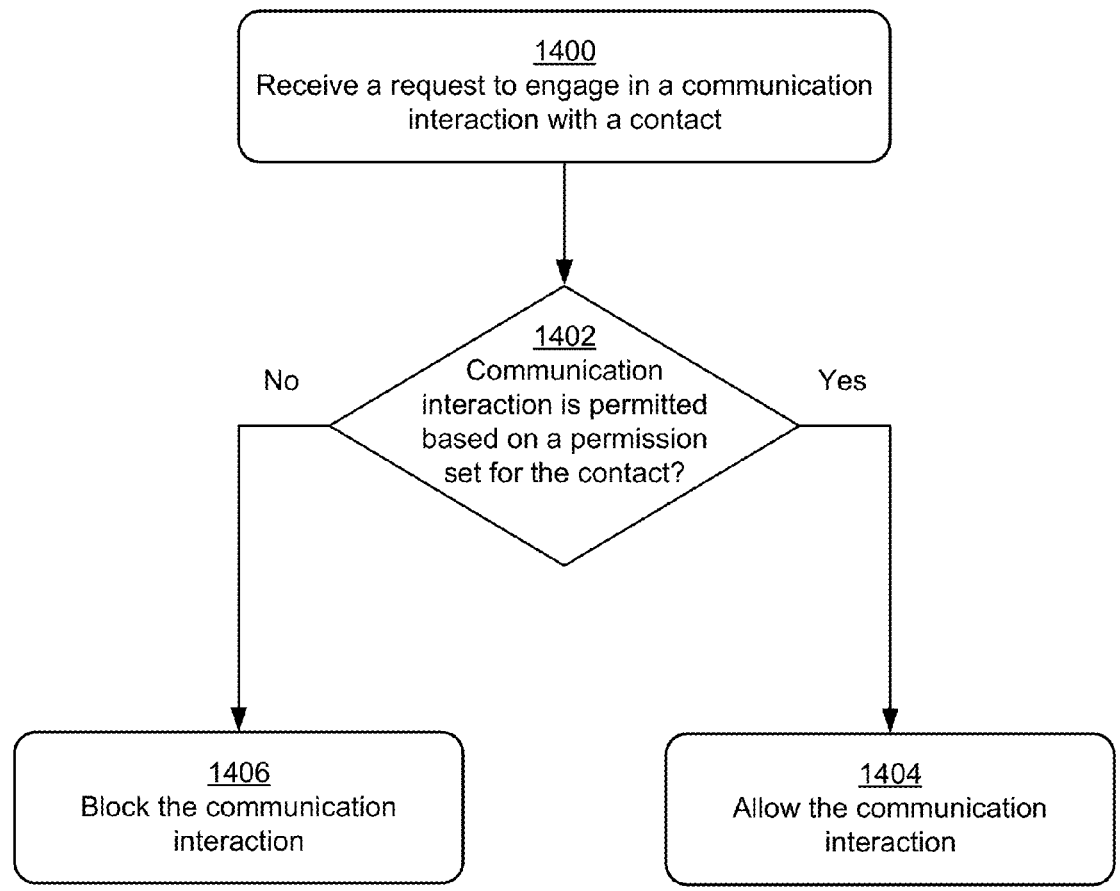
FIG. 14 is a flow diagram that describes steps in a method for ascertaining whether a communication interaction is permitted in accordance with one or more embodiments.

FIG. 14 is a flow diagram that describes steps in a method in accordance with one or more implementations. The method, for instance, describes an example procedure for ascertaining whether a communication interaction is permitted in accordance with one or more implementations. For example, the method describes an example way for performing step 606 of the procedure discussed above with reference to FIG. 6, and represents an extension of the procedure.

Step 1400 receives a request to engage in a communication interaction with a contact. The communication interaction, for instance, represents an exchange of communication-related data between the contact device 120 and the client device 102. In at least some implementations, the request includes a request from the client communication app 112 for presence information for the contact 122, and thus the communication interaction involves receiving presence information from the contact device 120. The request, for example, is received and processed by the communication service 128.

Alternatively or additionally, the request includes a request by the user 104 to engage in a communication event with the contact 122, such as a VoIP call, a video call, an instant message, and so forth.

Step 1402 ascertains whether the communication interaction is permitted based on a permission set for the contact.

The permission set, for instance, specifies allowed and/or disallowed communication interactions. Example attributes of permission sets are described above. In an example implementation, the communication service 128 identifies a permission set to be used for the contact based on a current primary identity for the contact. Ways of resolving and identifying a current identity for a contact are detailed above.

If the communication interaction is permitted based on the permission set ("Yes"), step 1404 allows the communication interaction. The communication service 128, for instance, ascertains that the communication interaction is permitted by one or more permissions of the permission set, and thus allows an exchange of communication-related data between the contact device 120 and the client device 102 as part of the communication interaction.

If the communication interaction is not permitted based on the permission set ("No"), step 1406 blocks the communication interaction. The communication service 128, for instance, ascertains that the communication interaction is not permitted by one or more permissions of the permission set, and thus does not allow an exchange of communication-related data between the contact device 120 and the client device 102 as part of the communication interaction.

Thus, techniques discussed herein enable contact identities to be tracked and updated based on changes in contact identity state, and enable appropriate permissions to be identified based on a current identity state of a contact. A contact's privacy and security are thus protected by enabling their permission settings to be enforced across different identities for the contact and across changes in identity state for the contact.

Having discussed some example procedures, consider now a discussion of an example system and device in accordance with one or more embodiments.

Example System and Device

Figure 15:
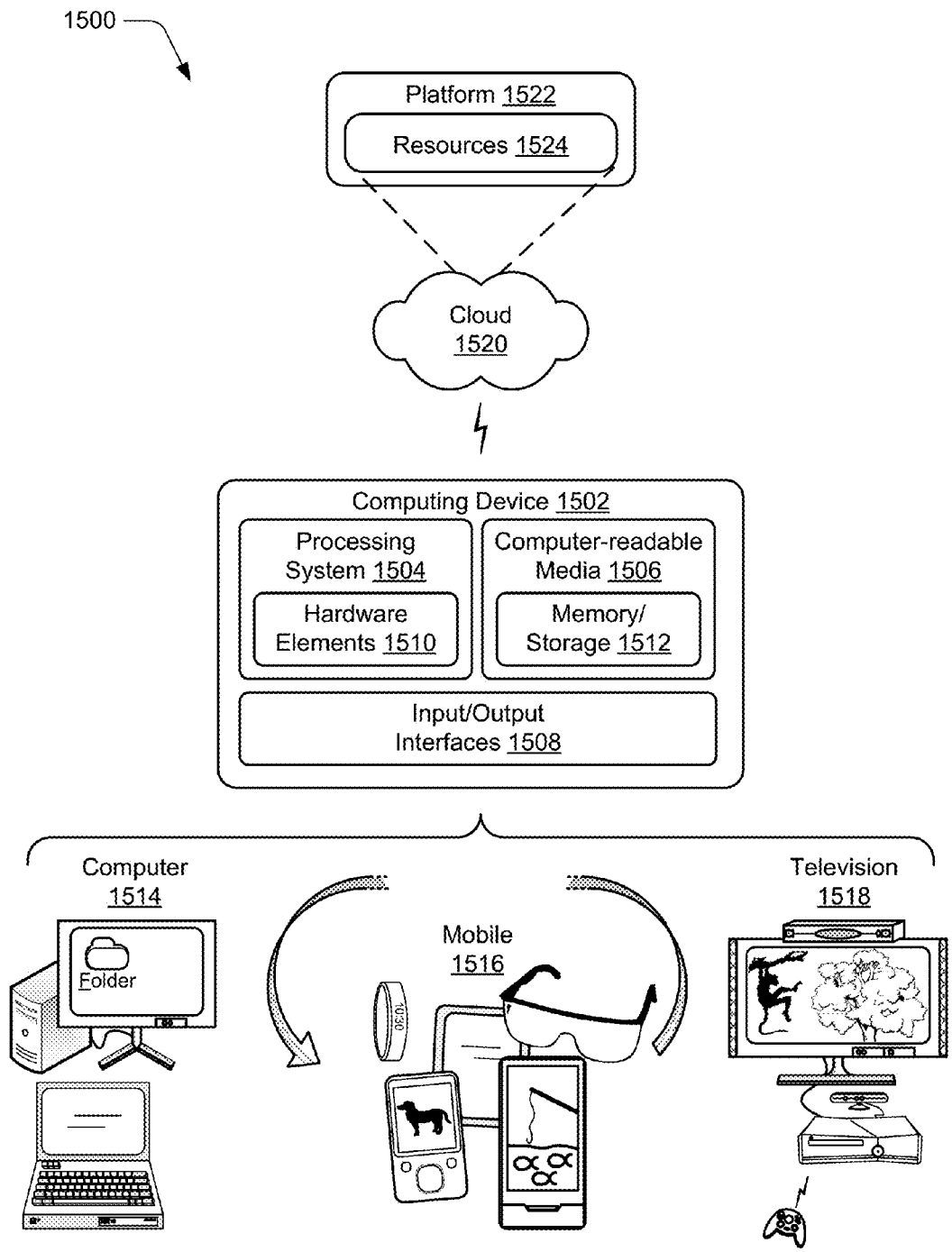
FIG. 15 illustrates an example system and computing device as described with reference to FIG. 1, which are configured to implement embodiments of techniques described herein.

FIG. 15 illustrates an example system generally at 1500 that includes an example computing device 1502 that is representative of one or more computing systems and/or devices that may implement various techniques described herein. For example, the client device 102 discussed above with reference to FIG. 1 can be embodied as the computing device 1502. The computing device 1502 may be, for example, a server of a service provider, a device associated with the client (e.g., a client device), an on-chip system, and/or any other suitable computing device, apparatus, and/or computing system.

The example computing device 1502 as illustrated includes a processing system 1504, one or more computer-readable media 1506, and one or more I/O Interfaces 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1506 is illustrated as including memory/storage 1512. The memory/storage 1512 represents memory/storage capacity associated with one or more computer-readable media. The memory/storage 1512 may include volatile media (such as random access memory (RAM)) and/or nonvolatile media (such as read only memory (ROM), Flash memory, optical disks, magnetic disks, and so forth). The memory/storage 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone (e.g., for implementing voice and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "service," "entity," "platform," "manager," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of modules as an module that is executable by the computing device 1502 as software may be achieved at least partially in hardware, e.g., through use of computer-readable storage media and/or hardware elements 1510 of the processing system. The instructions and/or functions may be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1514, mobile 1516, and television 1518 uses. Each of these configurations includes devices that may have generally different constructs and capabilities, and thus the computing device 1502 may be configured according to one or more of the different device classes. For instance, the computing device 1502 may be implemented as the computer 1514 class of a device that includes a personal computer, desktop computer, a multi-screen computer, laptop computer, netbook, and so on.

The computing device 1502 may also be implemented as the mobile 1516 class of device that includes mobile devices, such as a mobile phone, wearable device, portable music player, portable gaming device, a tablet computer, a multi-screen computer, and so on. The computing device 1502 may also be implemented as the television 1518 class of device that includes devices having or connected to generally larger screens in casual viewing environments. These devices include televisions, set-top boxes, gaming consoles, and so on.

The techniques described herein may be supported by these various configurations of the computing device 1502 and are not limited to the specific examples of the techniques described herein. For example, functionalities discussed with reference to the client device 102, the communication service 128, and/or the identity manager service 132 may be implemented all or in part through use of a distributed system, such as over a "cloud" 1520 via a platform 1522 as described below.

The cloud 1520 includes and/or is representative of a platform 1522 for resources 1524. The platform 1522 abstracts underlying functionality of hardware (e.g., servers) and software resources of the cloud 1520. The resources 1524 may include applications and/or data that can be utilized while computer processing is executed on servers that are remote from the computing device 1502. Resources 1524 can also include services provided over the Internet and/or through a subscriber network, such as a cellular or Wi-Fi™ network.

The platform 1522 may abstract resources and functions to connect the computing device 1502 with other computing devices. The platform 1522 may also serve to abstract scaling of resources to provide a corresponding level of scale to encountered demand for the resources 1524 that are implemented via the platform 1522. Accordingly, in an interconnected device embodiment, implementation of functionality described herein may be distributed throughout the system 1500. For example, the functionality may be implemented in part on the computing device 1502 as well as via the platform 1522 that abstracts the functionality of the cloud 1520.

Discussed herein are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system including: at least one processor; and one or more computer-readable storage media including instructions stored thereon that, responsive to execution by the at least one processor, cause the system perform operations including: receiving an indication that a communication relationship is established between a user and a contact of the user; resolving a set of multiple identities for the contact to specify a primary identity and one or more secondary identities for the contact; utilizing the primary identity to identify a permission set linked to the primary identity and that specifies one or more parameters for the communication relationship; and causing the permission set to be enforced for one or more communication interactions between the user and the contact.

Example 2

A system as described in example 1, wherein the communication relationship includes the user subscribing to receive presence information for the contact.

Example 3

A system as described in one or more of examples 1 or 2, wherein the operations further include: ascertaining that a request from the user to establish the communication relationship is granted; and causing the communication relationship to be established.

Example 4

A system as described in one or more of examples 1-3, wherein said resolving includes generating an entry in an identity table that specifies the primary identity and the one or more secondary identities.

Example 5

A system as described in one or more of examples 1-4, wherein said resolving includes: ascertaining that the contact has a communication service identity that is linked to an identity platform identity for the contact; and designating the identity platform identity as a primary identity for the contact and the communication service identity as a secondary identity for the contact.

Example 6

A system as described in one or more of examples 1-5, wherein said resolving includes: ascertaining that a first identity of the contact is linked to second identity of the contact; and specifying the first identity as the primary identity, and the second identity as a secondary identity of the one or more secondary identities.

Example 7

A system as described in one or more of examples 1-6, wherein said causing the permission set to be enforced includes: receiving a request from the user to engage in a communication interaction with the contact; and allowing or disallowing the communication interaction based on whether the communication interaction is permitted by the permission set.

Example 8

A system as described in one or more of examples 1-7, wherein the operations further include: receiving communication-related data from the contact including a current primary identity of the contact; ascertaining whether the current primary identity of the contact matches a contact identity specified for the contact in a contact list; and processing an identity table for the contact based on whether the current primary identity of the contact matches the contact identity specified for the contact in the contact list, said processing including updating the identity table to specify the current primary identity as the primary identity for the contact.

Example 9

A computer-implemented method including: receiving an indication that a communication relationship is established between a user and a contact of the user; resolving by a computing system a set of multiple identities for the contact to specify a primary identity and one or more secondary identities for the contact, including: ascertaining that a first identity of the contact is linked to second identity of the contact; and specifying the first identity as the primary identity, and the second identity as a secondary identity of the one or more secondary identities; utilizing by the computing system the primary identity to identify a permission set linked to the primary identity and that specifies one or more parameters for the communication relationship; and causing by the computing system the permission set to be enforced for one or more communication interactions between the user and the contact.

Example 10

A computer-implemented method as described in example 9, wherein the communication relationship causes the user to receive presence information for the contact.

Example 11

A computer-implemented method as described in one or more of examples 9 or 10, wherein said specifying includes specifying the first identity as the primary identity based on the first identity being a higher-priority identity than the second identity.

Example 12

A computer-implemented method as described in one or more of examples 9-11, wherein the second identity is linked to a different permission set than the first identity, and wherein said causing includes causing the permission set linked to the primary identity to be given priority over the different permission set.

Example 13

A computer-implemented method as described in one or more of examples 9-12, including: receiving a request from the user to engage in a communication interaction with the contact; and allowing or disallowing the communication interaction based on whether the communication interaction is permitted by the permission set.

Example 14

A computer-implemented method as described in one or more of examples 9-13, wherein said resolving includes causing the primary identity and the one or more secondary identities to be stored in an identity table, the method further including: receiving communication-related data from the contact including a current primary identity of the contact; ascertaining that the current primary identity of the contact does not match a contact identity specified for the contact in a contact list; and processing by the computing system the identity table for the contact to update the identity table to specify the current primary identity as the primary identity for the contact.

Example 15

A computer-implemented method including: receiving communication-related data from a contact including a current primary identity of the contact; ascertaining by a computing system whether the current primary identity of the contact matches a contact identity specified for the contact in a contact list; processing by the computing system an identity table for the contact based on whether the current primary identity of the contact matches the contact identity specified for the contact in the contact list, said processing causing the identity table to specify the current primary identity as a primary identity for the contact; utilizing the primary identity to identify a permission set linked to the stored primary identity and that specifies one or more parameters for a communication relationship between a user and the contact; and causing by the computing system the permission set to be enforced for one or more communication interactions between the user and the contact.

Example 16

A computer-implemented method as described in example 15, wherein the communication-related data includes one or more of presence information for the contact or a communication event from the contact.

Example 17

A computer-implemented method as described in one or more of examples 15 or 16, wherein said ascertaining includes ascertaining that the current primary identity of the contact does not match a contact identity specified for the contact in a contact list, and wherein said processing includes processing the identity table to create a new user entry with the current primary identity.

Example 18

A computer-implemented method as described in one or more of examples 15-17, wherein said ascertaining includes ascertaining that the current primary identity of the contact matches a contact identity specified for the contact in a contact list, and wherein said processing includes: ascertaining that the current primary identity exists as a secondary identity in the identity table; removing the secondary identity from the identity table; and processing the identity table to create a new user entry with the current primary identity.

Example 19

A computer-implemented method as described in one or more of examples 15-18, wherein said ascertaining includes ascertaining that the current primary identity of the contact matches a contact identity specified for the contact in a contact list, and wherein said processing includes: ascertaining that the current primary identity exists as a primary identity in the identity table; updating the identity table based on whether one or more current secondary identities received with the communication-related data match one or more existing secondary identities linked to the primary identity in the identity table.

Example 20

A computer-implemented method as described in one or more of examples 15-19, wherein said causing by the computing system the permission set to be enforced includes: receiving a request from the user to engage in a communication interaction with the contact; and allowing or disallowing the communication interaction based on whether the communication interaction is permitted by the permission set.

CONCLUSION

Techniques for identity management for permissions are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:
1. A system comprising:
at least one processor; and
one or more computer-readable storage media including instructions stored thereon that, responsive to execution by the at least one processor, cause the system perform operations including:
receiving an indication that a communication relationship is established between a user and a contact of the user;
resolving a set of multiple identities for the contact to specify a primary identity and one or more secondary identities for the contact;

utilizing the primary identity to identify a permission set linked to the primary identity and that specifies one or more parameters for the communication relationship; and causing the permission set to be enforced for one or more communication interactions between the user and the contact such that the permission set for the primary identity is given priority over a different permission set associated with the one or more secondary identities.

2. A system as described in claim 1, wherein the communication relationship comprises the user subscribing to receive presence information for the contact.

3. A system as described in claim 1, wherein the operations further include:
ascertaining that a request from the user to establish the communication relationship is granted; and
causing the communication relationship to be established.

4. A system as described in claim 1, wherein said resolving comprises generating an entry in an identity table that specifies the primary identity and the one or more secondary identities.

5. A system as described in claim 1, wherein said resolving comprises:
ascertaining that the contact has a communication service identity that is linked to an identity platform identity for the contact; and
designating the identity platform identity as a primary identity for the contact and the communication service identity as a secondary identity for the contact.

6. A system as described in claim 1, wherein said resolving comprises:
ascertaining that a first identity of the contact is linked to second identity of the contact; and
specifying the first identity as the primary identity, and the second identity as a secondary identity of the one or more secondary identities.

7. A system as described in claim 1, wherein said causing the permission set to be enforced comprises:
receiving a request from the user to engage in a communication interaction with the contact; and
allowing or disallowing the communication interaction based on whether the communication interaction is permitted by the permission set.

8. A system as described in claim 1, wherein the operations further include:
receiving communication-related data from the contact including a current primary identity of the contact;
ascertaining whether the current primary identity of the contact matches a contact identity specified for the contact in a contact list; and
processing an identity table for the contact based on whether the current primary identity of the contact matches the contact identity specified for the contact in the contact list, said processing including updating the identity table to specify the current primary identity as the primary identity for the contact.

9. A computer-implemented method comprising:
receiving an indication that a communication relationship is established between a user and a contact of the user;
resolving by a computing system a set of multiple identities for the contact to specify a primary identity and one or more secondary identities for the contact, including:
ascertaining that a first identity of the contact is linked to second identity of the contact; and
specifying the first identity as the primary identity, and the second identity as a secondary identity of the one or more secondary identities;
utilizing by the computing system the primary identity to identify a permission set linked to the primary identity and that specifies one or more parameters for the communication relationship; and
causing by the computing system the permission set to be enforced for one or more communication interactions between the user and the contact such that the permission set for the primary identity is given priority over a different permission set associated with the one or more secondary identities.

10. A computer-implemented method as recited in claim 9, wherein the communication relationship causes the user to receive presence information for the contact.

11. A computer-implemented method as recited in claim 9, wherein said specifying comprises specifying the first identity as the primary identity based on the first identity being a higher-priority identity than the second identity.

12. A computer-implemented method as recited in claim 9, wherein the second identity is linked to a different permission set than the first identity, and wherein said causing comprises causing the permission set linked to the primary identity to be given priority over the different permission set linked to the second identity.

13. A computer-implemented method as recited in claim 9, comprising:
receiving a request from the user to engage in a communication interaction with the contact; and
allowing or disallowing the communication interaction based on whether the communication interaction is permitted by the permission set.

14. A computer-implemented method as recited in claim 9, wherein said resolving comprises causing the primary identity and the one or more secondary identities to be stored in an identity table, the method further comprising:
receiving communication-related data from the contact including a current primary identity of the contact;
ascertaining that the current primary identity of the contact does not match a contact identity specified for the contact in a contact list; and
processing by the computing system the identity table for the contact to update the identity table to specify the current primary identity as the primary identity for the contact.

15. A computer-implemented method comprising:
receiving communication-related data from a contact including a current primary identity of the contact;
ascertaining by a computing system whether the current primary identity of the contact matches a contact identity specified for the contact in a contact list;
processing by the computing system an identity table for the contact based on whether the current primary identity of the contact matches the contact identity specified for the contact in the contact list, said processing causing the identity table to specify the current primary identity as a primary identity for the contact;
utilizing the primary identity to identify a permission set linked to the stored primary identity and that specifies one or more parameters for a communication relationship between a user and the contact; and
causing by the computing system the permission set to be enforced for one or more communication interactions between the user and the contact such that the permission set for the primary identity is given priority over a different permission set associated with one or more secondary identities.

16. A computer-implemented method as described in claim 15, wherein the communication-related data includes one or more of presence information for the contact or a communication event from the contact.

17. A computer-implemented method as described in claim 15, wherein said ascertaining comprises ascertaining that the current primary identity of the contact does not match a contact identity specified for the contact in a contact list, and wherein said processing comprises processing the identity table to create a new user entry with the current primary identity.

18. A computer-implemented method as described in claim 15, wherein said ascertaining comprises ascertaining that the current primary identity of the contact matches a contact identity specified for the contact in a contact list, and wherein said processing comprises:
 ascertaining that the current primary identity exists as a secondary identity in the identity table;
 removing the secondary identity from the identity table; and
 processing the identity table to create a new user entry with the current primary identity.

19. A computer-implemented method as described in claim 15, wherein said ascertaining comprises ascertaining that the current primary identity of the contact matches a contact identity specified for the contact in a contact list, and wherein said processing comprises:
 ascertaining that the current primary identity exists as a primary identity in the identity table;
 updating the identity table based on whether one or more current secondary identities received with the communication-related data match one or more existing secondary identities linked to the primary identity in the identity table.

20. A computer-implemented method as described in claim 15, wherein said causing by the computing system the permission set to be enforced comprises:
 receiving a request from the user to engage in a communication interaction with the contact; and
 allowing or disallowing the communication interaction based on whether the communication interaction is permitted by the permission set.

* * * * *